1,535,500

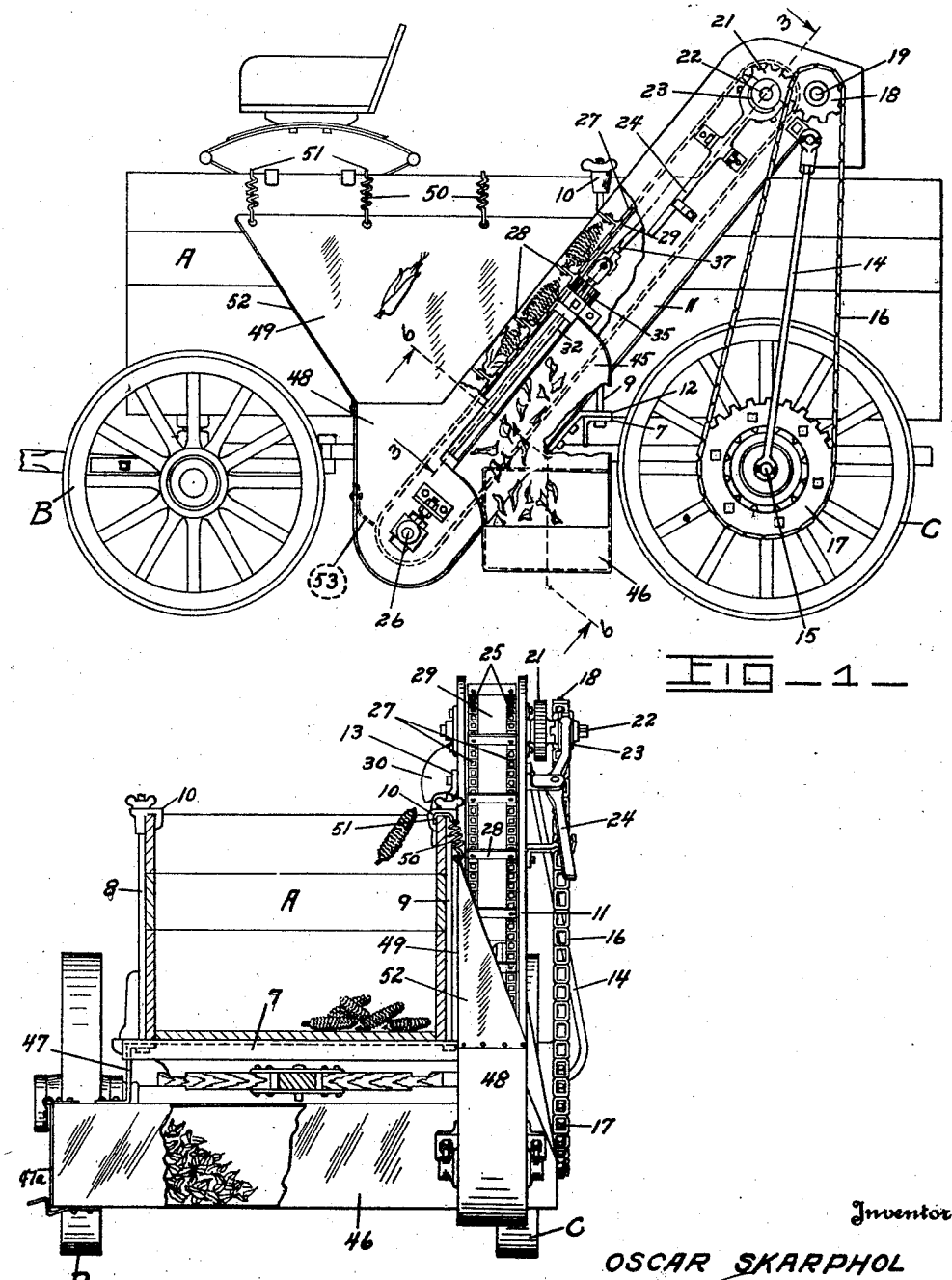
April 28, 1925.
O. SKARPHOL
CORN HUSKER
Filed Jan. 24, 1924
1,535,500
2 Sheets-Sheet 1
FIG-1-
FIG-2-
Inventor
OSCAR SKARPHOL
By
Attorney April 28, 1925.
O. SKARPHOL
CORN HUSKER
Filed Jan. 24, 1924
1,535,500
2 Sheets-Sheet 2
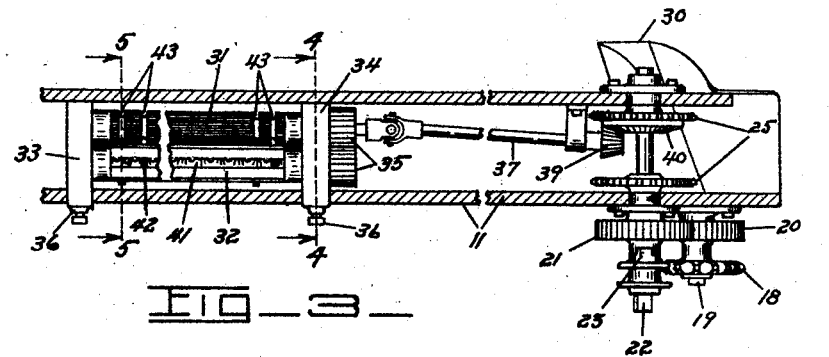
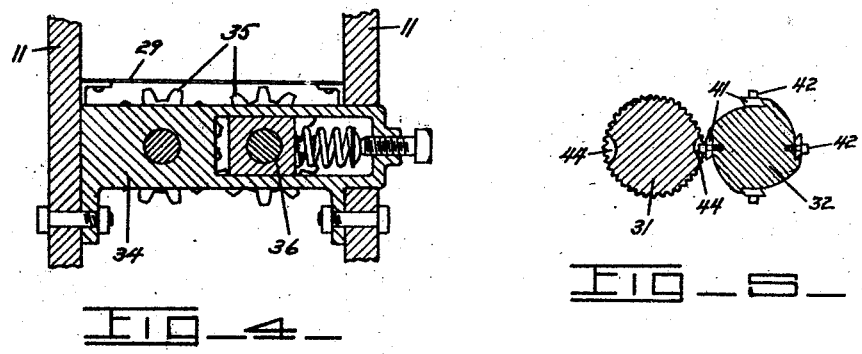
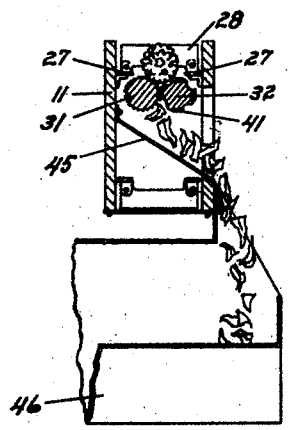
Inventor
OSCAR SKARPHOL
Attorney Patented Apr. 28, 1925.

UNITED STATES PATENT OFFICE.

OSCAR SKARPHOL, OF DALTON, MINNESOTA.

CORN HUSKER.

Application filed January 24, 1924. Serial No. 688,203.

*To all whom it may concern:*

Be it known that I, OSCAR SKARPHOL, a citizen of the United States, residing at Dalton, in the county of Otter Tail and State of Minnesota, have invented certain new and useful Improvements in Corn Huskers, of which the following is a specification.

This invention relates to corn husking machines, and the main object is to provide a novel, practical and efficient device adapted to be secured upon the side of an ordinary farm wagon, and adapted to be driven by one of the ground wheels thereof, which will husk the ears of corn and elevate them into the wagon as it travels along through the field and the corn is thrown into the husker. Further and more specific objects will be disclosed in the course of the following specification, reference being had to the accompanying drawings, wherein:

Fig. 1 is a left side elevation of a wagon, showing my attachment as secured thereto.

Fig. 2 is a front elevation of the device, and showing the front end of the wagon broken away.

Fig. 3 is a sectional view, as seen on the line 3—3 in Fig. 1.

Fig. 4 is an enlarged sectional detail view on the line 4—4 in Fig. 3.

Fig. 5 is an enlarged section, slightly modified, on the line 5—5 in Fig. 3.

Fig. 6 is a section, as seen substantially on the line 6—6 in Fig. 1.

Referring to the drawing more particularly and by reference characters A designates the box of a farm wagon having a front truck B and rear wheels C and D, of common and well known construction.

The husker is supported primarily on an angle iron cross bar 7 which is secured transversely under the wagon box and thereagainst by a pair of long vertical bolts 8 and 9, having hooks 10 which hook over the clamp down upon the opposite sides of the wagon box. An inclined conveyor casing or frame 11 has a bracket 12, which rests on one end of the cross bar 7. Near the upper end of the conveyor frame is a bracket 13 (see Fig. 2), which slidably engages the wagon box, to hold that end of the conveyor close to the wagon. The upper end of the conveyor frame is also supported on and connected by a radius rod 14, to the rear axle 15 of the wagon, so that a chain 16, which connects a gear 17 on the wheel C to a sprocket gear 18 on the conveyor, will be uniformly stretched, when the position of the box changes vertically with respect to the rear wheels, which it will naturally do to some extent as the weight of the load and traveling conditions vary. The large gear 17 is preferably one that may be readily bolted or otherwise secured upon any standard type of wagon wheel. It may also be noted that the bar 14 is bowed outwardly near its lower end so as to clear the gear 17.

The sprocket gear 18 is mounted upon a stub shaft 19, journaled to the conveyor, and drives a pair of intermeshing spur gears 20 and 21. The gear 21 is mounted on and adapted to drive a conveyor shaft 22, to which it is operatively connected and disconnected by a clutch 23 having a hand lever 24. The shaft 22 has a pair of sprocket gears 25, over which, and over similar gears on the shaft 26 in the lower end of the frame, is stretched an endless carrier consisting of chains 27 and cross cleats 28. The cleats 28 serve to carry the husked cobs of corn from the husker (soon to be described) up a platform 29, to the end of the carrier, where they drop upon an inclined chute or spout 30 which delivers them to the wagon box.

The husking device proper consists of a pair of co-acting rollers 31 and 32, which are arranged parallel to and directly under a lower portion of the upper run of the endless carrier. These rollers are journaled at their ends in cross members 33 and 34 of the conveyor frame, and are provided with intermeshing spur pinions 35. The end bearings 36 of the roller 32 are slidable with respect to the roller 31, but are spring held toward the same, to allow some spread between the rollers, when heavy husks are pulled therebetween. The teeth of the pinions 35 are long enough, however, to keep in mesh when such spreading of the rollers takes place. One (and therefore both) of the rollers is driven by a shaft 37, having a universal joint 38, at one end, connecting it to the roller shaft, and a bevel pinion 39 at its other end, which meshes with and is driven by a bevel gear 40 on the shaft 22.

The roller 31 is longitudinally corrugated, while the roller 32 is preferably more irregular and is provided with serrated cutters 41, which are secured by bolts 42, the heads of which pass between the rollers by reason of annular channels 43 (see Fig. 3) or notches 44 (see Fig. 5) in the opposite roller. As these rollers turn toward each other and the cobs are carried up over them by the endless carrier, the result is that the leaves and husks of the cobs are caught between the rollers and pulled off, while the husked cobs are too large to be caught by the rollers and keep traveling up the conveyor until they fall into the wagon.

As the husks are pulled down and liberated below the rollers 31, 32 they fall upon an apron 45, which leads them to an elongated container 46 which is transversely disposed and supported under the wagon box by suitable brackets 47. This container is open at the apron end, as shown in Figs. 1 and 6, so that as the husks accumulate at that end they may be pushed into the other end by any suitable device such as a broom, rake or hoe. When the container is full of husks a latch held door 47ª at its right end may be opened and all the husks can then be pushed completely out and used for fuel or any other purpose desired. The container 46 may of course be of any size, but is preferably large enough to accommodate the husks of a wagon load of husked corn, so that the container may be emptied each time the wagon is driven in to be unloaded.

The unhusked corn is fed to the conveyor and husking rollers by an open hopper which consists of an enlarged portion 48 of the conveyor casing, and an apron 49 which is preferably made of canvas or other textile fabric, and is hung or suspended in place by springs 50 having hooks 51 which engage over the wagon box. The apron is preferably widest at its upper end, and is provided with an outwardly projecting end flap 52 which meets the front edge of the casing, so as to more readily catch the cobs that are tossed against it by the person picking and lead them to the lower end of the hopper and conveyor. A flexible guide 53 (see Fig. 1) may be arranged in the lower end of the conveyor, to prevent cobs from jamming down between the endless carrier and the hopper, should there be any tendency to do so.

It is understood that suitable modifications may be made in the general design and structural details of the invention as herein set forth and described, provided, however, that such modifications come within the spirit and scope of the appended claims.

Having now therefore fully shown and described my invention, what I claim to be new and desire to protect by Letters Patent is:

1. The combination of an open cob hopper adapted to be arranged upon the side of the wagon, a pair of husking rollers, an endless carrier adapted to carry ears of corn from the hopper, over the husking rollers, and deliver them up into the wagon, a container arranged transversely under the wagon for receiving husks, and means for delivering husks from the husking rollers into the container.

2. The combination with a husking device adapted to be arranged upon the side of a wagon or the like, of a container transversely arranged under the wagon with one end in a receiving position under the husking device, and a door closing the other end of the container.

3. The combination with an endless carrier adapted to be secured upon a wagon for delivering ears of corn thereto, a pair of husking rollers arranged under the upper run of the carrier, a container arranged under the wagon, and an inclined apron arranged to deliver husks falling from the husking rollers to the container.

4. A conveyor frame adapted to be arranged upon a wagon or the like, and containing an endless carrier and a husking device co-operatively arranged adjacent thereto, a sprocket wheel at the upper end of the frame to drive the conveyor, a sprocket wheel on one of the wagon wheels, a chain operatively connecting said sprocket wheels, and a link bar connecting the upper end of the conveyor to the axle of said wagon wheel.

5. A conveyor frame adapted to be tiltably mounted upon the side of a wagon and having an endless carrier and husking rollers arranged below the upper run thereof, means at the upper end of the frame, and operatively connected to one of the ground wheels of the wagon, to drive said rollers and carrier, and means to retain the upper end of the frame at a uniform distance from the said ground wheel.

6. The combination with an inclined frame having an endless carrier and husking rollers adjacent thereto, of means for driving the carrier and rollers, and a hopper at the lower end of the frame, said hopper comprising an upwardly diverging apron adapted to catch ears of corn thrown against it and deliver them to the lower end of the carrier.

7. The combination with an inclined frame having an endless carrier and husking rollers adjacent thereto, of means for driving the carrier and rollers, and a hopper at the lower end of the frame, said hopper comprising an upwardly diverging apron adapted to catch ears of corn thrown against it and deliver them to the lower end of the carrier, and spring means at the upper edge of the apron for retaining the same in operative position.

8. A husking machine including a conveyor having an endless carrier, husking rollers arranged adjacent to and immediately under the upper run of the carrier, said carrier consisting of laterally spaced side chains connected at spaced intervals by transverse cleats, so that ears of corn carried by said cleats over the husking rollers will be permitted to be engaged by said rollers between the cleats and between the chain of the carrier.

9. A husking machine including an inclined conveyor having a platform, husking means adjacent to the lower end of the platform, and a carrier adapted to convey ears of corn progressively up over the husking means and platform.

10. A husking machine including an inclined conveyor having a platform, husking means adjacent to the lower end of the platform, and a carrier adapted to convey ears of corn progressively up over the husking means and platform, said carrier comprising longitudinal side members and transversely arranged cross members connecting the side members.

11. The combination with a wagon, of a support projecting laterally to one side thereof, an inclined conveyor, mounted for slight tilting movement upon said support, and including a carrier and a husking device, means actuated by a rear wheel of the wagon to operate the carrier and husking device, and means to retain the upper end of the conveyor at a uniform distance from said wagon wheel.

In testimony whereof I affix my signature.

OSCAR SKARPHOL.